United States Patent [19]

Mrowca

[11] 3,728,365
[45] Apr. 17, 1973

[54] CYCLOPENTADIENYL-(GROUP IV-B METAL) HYDROCARBYL SULFINATES

[75] Inventor: Joseph J. Mrowca, 1513 Forsythia Avenue, Wilmington, Del. 19803

[22] Filed: Sept. 25, 1970

[21] Appl. No.: 75,694

[52] U.S. Cl.............260/429.5, 71/97, 260/429 CY, 260/429.3
[51] Int. Cl.................................C07f 7/28
[58] Field of Search.....................260/429.3, 429.5, 260/429 CY

[56] References Cited

UNITED STATES PATENTS

| | | | |
|---|---|---|---|
| 2,983,740 | 5/1961 | Thomas et al. | 260/429.3 |
| 3,038,915 | 6/1962 | Barkdoll et al. | 260/429.5 |
| 3,127,431 | 3/1964 | Fink | 260/429.7 |

OTHER PUBLICATIONS

Chemical Abstracts, Vol. 63, 9844e (1965).
Chemical Abstracts, Vol. 61, 14176e (1964).
Wojcicki et al., J. Amer. Chem. Soc. Vol. 86, 5051 (1964), Vol. 88, 844,4862 (1966), Vol. 89, 2493 (1967), Vol. 90, 2709 (1968).
Wojcicki et al., Inorg. Chem., Vol. 7, 1504 (1968).
Volger et al., J. Organometallic Chem. Vol. 13, 495 (1968).
Lindner et al., J. Organometallic Chem. Vol. 13, pg. 431 (1968).
Lindner et al., Chem. Ber., Vol. 102, 4053, 4062 (1969).
Chemical Abstracts, Vol. 69, 96067a (1968).
Chemical Abstracts, Vol. 56, 11607e.

*Primary Examiner*—Helen M. S. Sneed
*Attorney*—James H. Ryan

[57] ABSTRACT

Novel sulfinato derivatives of cyclopentadienyl-titanium and -zirconium compounds, useful as plant-growth regulants, are prepared (1) by reacting sulfur dioxide with certain unsubstituted or substituted (cyclopentadienyl) titanium or -zirconium compounds or (2) by reacting a hydrocarbon sulfinic acid salt with a compound of the formula $Cp_aMX_{b+c}$; e.g., bis(benzenesulfinato)dicyclopentadienyltitanium (1) from $SO_2$ and dicyclopentadienyldiphenyltitanium or (2) from sodium benzenesulfinate and dichloro(dicyclopentadienyl)-titanium.

9 Claims, No Drawings

CYCLOPENTADIENYL-(GROUP IV-B METAL) HYDROCARBYL SULFINATES

BACKGROUND OF THE INVENTION

1. Field of the Invention

This invention relates to, and has as its principal object provision of, certain novel sulfinato derivatives of cyclopentadienyl-titanium and -zirconium compounds.

2. Prior Art

The prior art describes the preparation of various transition-metal compounds containing the $-SO_2M-$ moiety, where M is a transition metal. The methods of preparation include (a) reaction of sulfur dioxide with a hydrocarbyl-transition-metal compound, (b) reaction of a sodium hydrocarbonsulfinate with a transition-metal halide, and (c) reaction of a hydrocarbonsulfonyl halide or a hydrocarbonsulfonic anhydride with a transition metal compound.

In all of these products, the $SO_2$ group is bonded to the transition-metal through sulfur; the products contain one or the other of the linkages

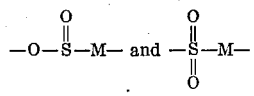

It has also been shown that if certain of these $SO_2$-transition-metal compounds are reacted with bidentat donor ligands, complexes are formed in which the $-SO_2M-$ linkages have rearranged to $-S(O)O-M-$, i.e., sulfur bonded through oxygen to M. It is important to note that these compounds are not formed in the reaction in which the $SO_2$ moiety is first introduced, but by secondary reactions of the primary products.

The transition metals that were used in these studies include manganese, rhenium, iron, cobalt, palladium, platinum, chromium, molybdenum, and nickel.

References describing the foregoing work are:

Wojcicki et al., J. Am. Chem. Soc. 86, 5051 (1964); 88, 844, 4862 (1966); 89, 2493 (1967); 90, 2709 (1968); Inorg. Chem. 7, 1504 (1968); and Inorg. Chim. Acta 2, 289 (1968).

Chiswell and Venanzi, J. Chem. Soc. (A), 1966, 1246.

Lindner et al., Z. Naturforschg. 22b, 1243 (1967); and J. Organometallic Chem. 13, 431 (1968).

Volger and Vrieze, J. Organometallic Chem. 13, 495 (1968).

Lidner and Vitzthum, Chem. Ber. 102, 4053, 4062 (1969).

DESCRIPTION AND DETAILS OF THE INVENTION

In accordance with the present invention, it has now been found that if sulfur dioxide is reacted with certain organic derivatives of the transition metals titanium and zirconium, or if a sodium hydrocarbonsulfinate is reacted with an organic titanium or zirconium halide, products containing $SO_2$ moieties bonded to the metal through oxygen are obtained directly. These compounds contain the structural feature

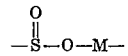

where M is titanium or zirconium. The products are distinguished from compounds containing

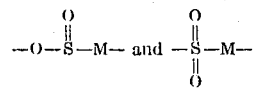

linkages by their nuclear-magnetic-resonance and infrared absorption spectra.

More specifically, the products of the invention are compounds of the formula

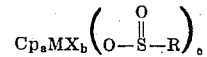

wherein:

Cp is cyclopentadienyl, optionally substituted with one or more lower alkyl or phenyl groups (lower alkyl is defined as an alkyl group containing up to 8 carbons);

$a$ is 1 or 2;

M is Ti or Zr;

X is halogen;

$b$ is 0 or 1;

R is lower alkyl, or phenyl, the phenyl being optionally substituted with a lower alkyl, lower alkoxy, di(lower alkyl)amino, trifluoromethyl, or halo group and containing up to a total of 12 carbons;

$c$ is 1, 2, or 3; and $a+b+c=4$.

In all these products the cyclopentadienyl or substituted cyclopentadienyl group is pi-bonded to the metal, and the titanium or zirconium is tetravalent, i.e., is in the +4 oxidation state.

The products of the invention can be prepared by two processes. In the first process, a compound of the formula $Cp_aMX_bR_c$, wherein the terms are defined as above, is reacted with sulfur dioxide. Reaction takes place according to the following equation:

In the second process a hydrocarbonsulfinic acid salt, $M'SO_2R$, wherein $M'$ is an alkali metal or one equivalent of an alkaline-earth metal, is reacted with a compound of the formula $Cp_aMX_{b+c}$. The reaction is represented by the following equation:

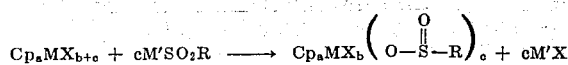

Examples of Cp groups are methylcyclopentadienyl, ethylcyclopentadienyl, isopropylcyclopentadienyl, t-butyl-cyclopentadienyl, heptylcyclopentadienyl, pentamethylcyclopentadienyl, phenylcyclopentadienyl, 1,3-diphenylcyclopentadienyl, 1,2,4-triphenyl-cyclopentadienyl, and tetraphenyl-cyclopentadienyl. Preferably Cp is cyclopentadienyl or methylcyclopentadienyl, since the corresponding starting materials, cyclopentadiene and methylcyclopentadiene, are commercially available hydrocarbons.

The maximum carbon content of the Cp group will be 45 carbons, and usually no greater than 29. A content no greater than 13 is most common.

Titanium is a preferred value of M because of availability.

X can be any halogen, i.e., F, Cl, Br, or I. Preferably, because of availability, X is Cl or Br, especially Cl.

Examples of R are methyl, ethyl, isobutyl, t-pentyl, s-butyl, isohexyl, octyl, naphthyl, biphenylyl, tolyl, propylphenyl, dimethylaminophenyl, butoxyphenyl, fluorophenyl, chlorophenyl, bromophenyl, and trifluoromethylphenyl. The preferred value of R in the products, because of ease of preparation, is hydrocarbyl, particularly lower primary alkyl or phenyl.

In the process involving sulfur dioxide, at least a stoichiometric amount of $SO_2$ is used. It is convenient and preferred to use excess sulfur dioxide, since the reaction is thereby promoted and unreacted $SO_2$ is easily removed by evaporation.

Since most of the titanium- and zirconium-containing starting materials are solids, a solvent is normally used in this process. Preferred solvents are aromatic hydrocarbons, such as benzene, alkylbenzenes (e.g., toluene, xylene, and ethylbenzene) and halobenzenes (e.g., fluorobenzene, chlorobenzene, and bromobenzene; preferably chlorobenzene). Also usable as solvents are aliphatic and cycloaliphatic hydrocarbons and halohydrocarbons, particularly chlorohydrocarbons. Examples are hexane, heptane, cyclohexane, methylcyclopentane, chloroform, 1,2-dichloroethane, and 1,2-dibromopropane.

Conveniently and preferably the process is carried out in the temperature range of about 0–25°C. However, it is operable over a wider range, namely, from about −50°C to 100°C. No particular advantage results from the lower or higher temperatures. The process is usually carried out in an open system. Closed systems, which permit higher pressures, and relatively higher temperatures can be used for relatively unreactive starting materials.

The process normally proceeds readily at ordinary temperatures and is usually essentially complete in less than about two hours-frequently in about 15 minutes. Sixteen hours is the maximum time usually required. As illustrated in the examples, the course of the reaction can be followed by the color change that takes place. The products, which are crystalline solids, can be isolated by evaporation of the solvent or by precipitation with a non-solvent.

In the second process M' will usually be an alkali metal, because of the availability of such salts. Sodium and potassium salts are preferred because of availability, particularly sodium salts.

The ratio of reactants is usually that dictated by the stoichiometry of the reaction. An excess of either reactant can be used, but no particular advantage results.

Any of a variety of solvents can be used. Preferred solvents are aprotic donor liquids. These include ethers such as tetrahydrofuran, 1,2-dimethoxyethane, dioxane, and di(2-ethoxyethyl) ether, and alkanenitriles such as acetonitrile and propionitrile. Hydrocarbons and halohydrocarbons can also be used but are less preferred.

The process can be operated over a range of temperature from about 0°C to the boiling point of the solvent. Normally the process is run somewhere between 0°C and about 100°C, the preferred temperature range being 20°–30°C, i.e., ordinary temperatures.

The time required will depend on the temperature and to some extent on the titanium- or zirconium-containing starting material. Usually no more than 24 hours is required. The process of the reaction can be followed by the color change in the solution and by the precipitation of alkali-metal halide or alkaline-earth metal halide that is formed as a by-product. After removal of this metal halide by filtration, the product of the invention can be isolated by evaporation or precipitation with a non-solvent.

This process is the preferred one for products in which c is 3.

EMBODIMENTS OF THE INVENTION

The following examples illustrate the products and processes of the invention. All temperatures are in degrees centigrade, unless otherwise indicated.

EXAMPLE 1

Chlorodicyclopentadienyl(ethanesulfinato)titanium

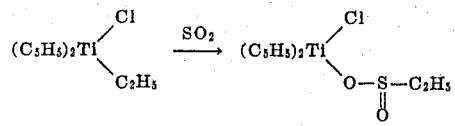

Dry sulfur dioxide was bubbled into a solution of 1.00 g of chloro(dicyclopentadienyl)ethyltitanium in 50 ml of dry benzene (prepared under nitrogen) at 5° for 5 min. The solution changed color rapidly from dark red to cherry red. The cooling bath was removed, and the sulfur dioxide was added for an additional 10 min. The solution was then evaporated to ca. 2 ml under vacuum, and ml of anhydrous ether was added to give 0.60 g of chlorodicyclopentadienyl-(ethanesulfinato)tianium as an orange-red solid. Cooling the ether filtrate overnight at −78° gave an additional 0.32 g. The pnmr and ir spectra of these solids were identical. An analytical sample (0.30 g, m.p. 88°–94°) was prepared by dissolving 0.40 g of the first solid in 10 ml of benzene, adding 75 ml of ether, filtering, and cooling the filtrate in dry ice.

Anal. Calcd for $C_{12}H_{15}ClO_2STi$: C, 47.00; H, 4.93; Cl, 11.56; S, 10.46.
Found: C, 47.47; H, 5.13; Cl, 10.95; S, 10.93.

The nmr (nuclear-magnetic-resonance) absorption spectrum showed a quartet at $\tau 7.47$ for the $CH_2$ protons. The infrared absorption spectrum (KBr disc) included a single band for $SO_2$ vibration at 1088 $cm^{-1}$. These findings confirm the structure in which sulfur is bonded to titanium through oxygen.

When the sulfur dioxide was added exclusively at ice-bath temperature and the solution was evaporated to dryness without addition of ether, a sample of the same product melting at 98°–100° was obtained.

EXAMPLE 2

Chlorodicyclopentadienyl(methanesulfinato)titanium

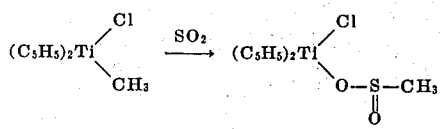

Dry sulfur dioxide was bubbled into a solution of 1.00 g of chloro(dicyclopentadienyl)methyltitanium in 50 ml of dry benzene (prepared under nitrogen) for 30 min. After standing for 1.5 hours, the reaction mixture was filtered under nitrogen, and the red filtrate was evaporated with a nitrogen stream. The red, crystalline residue was dried at 0.1 mm overnight to give 1.24 g of chlorodicyclopentadienyl-(methanesulfinato)titanum, m.p. 120°–123° dec.

Anal. Calcd for $C_{11}H_{13}ClO_2STi$: C, 45.13; H, 4.48; S, 10.97; Cl, 12.13.

Found: C, 44.85; H, 4.42; S, 10.70; Cl, 11.96.

The nmr absorption spectrum included a singlet at $\tau 7.75$ for the $CH_3$ protons, and the infrared absorption spectrum included a single band at 1090 cm$^{-1}$ corresponding to $SO_2$ vibration; both these absorptions confirm the

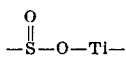

structure.

Treatment of the starting materials in the first column of the following table with sulfur dioxide by essentially the procedure of Examples 1 and 2 will give the products of the invention listed in the second column.

| Starting Material | Product |
| --- | --- |
| Chlorodicyclopentadienyl-(propyl)zirconium | Chlorodicyclopentadienyl-(propanesulfinato)-zirconium |
| Butylfluorobis(methyl cyclopentadienyl)titanium | Butanesulfinatofluorobis-(methylcyclopentadienyl)-titanium |

EXAMPLE 3

Bis(benzenesulfinato)dicyclopentadienyltitanium

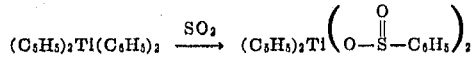

Dry sulfur dioxide was bubbled into a solution of dicyclopentadienyldiphenyltitanium in dry benzene for 3 hours. The flask was stoppered and stored overnight with stirring. The mixture was filtered, and the filtrate was concentrated under aspirator vacuum. The addition of anhydrous ether precipitated a red oil which solidified on standing to a red solid, bis(benzenesulfinato)dicyclopentadienyltitanium, m.p. 96°–115°C.

Anal. Calcd for $C_{22}H_{20}O_4S_2Ti$: C, 57.37; H, 4.39; S, 13.94.

Found: C, 57.28; H, 4.67; S, 13.58.

The infrared absorption spectrum (mineral-oil mull) included a single $SO_2$-vibration absorption at 1090–1100 cm$^{-1}$, which confirmed the sulfur-oxygen-titanium bonding.

Reaction of sulfur dioxide with the starting materials in the first column of the following table, by essentially the procedure of Example 3, gives the products of the invention in the second column.

| Starting Material | Product |
| --- | --- |
| Dicyclopentadienyldi-m-tolyltitanium | Dicyclopentadienylbis(m-toluenesulfinato)titanium |
| Dicyclopentadienyldiphenylzirconium | Dicyclopentadienylbis(benzenesulfinato)zirconium |
| Dimethylbis(phenylcyclopentadienyl)titanium | Bis(methanesulfinato)bis-(phenylcyclopentadienyl)titanium |

EXAMPLE 4

Bis(benzenesulfinato)dicyclopentadienyltitanium

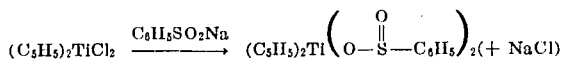

A mixture of 1.00 g of dichloro(dicyclopentadienyl)titanium, 2.00 g of sodium benzenesulfinate, and 50 ml of tetrahydrofuran was stirred under nitrogen for 24 hours. The mixture was filtered, and the filtrate was evaporated under vacuum. The red, viscous residue was treated with 100 ml of benzene and filtered. The filtrate was evaporated under vacuum to a low volume, and anhydrous ether was added to the residue. The resulting red oil solidified on standing to give bis(benzenesulfinato)dicyclopentadienyltitanium, the product of Example 3.

Reaction of the starting materials in the first column of the following table with the salts in the second column, by essentially the procedure of Example 4, will give the products of the invention in the third column.

| Starting Material | Coreactant | Product |
| --- | --- | --- |
| Tribromo(cyclopentadienyl)-titanium | Sodium methane-sulfinate | Cyclopentadienyltris-(methanesulfinato)titanium |
| Dichlorobis(methylcyclopentadienyl)titanium | Potassium benzene-sulfinate | Bis(benzenesulfinato)bis-(methylcyclopentadienyl)-titanium |
| Dibromo(dicyclopentadienyl)-zirconium | Sodium p-toluene-sulfinate | Dicyclopentadienyl-bis(p-toluenesulfinato)zirconium |

Additional examples of products of the invention are:

Bis(p-diethylaminobenzenesulfinato)bis(ethylcyclopentadienyl)titanium

Dicyclopentadienylbis(p-methoxybenzenesulfinato)zirconium

Bis(m-chlorobenzenesulfinato)dicyclopentadienyltitanium

Bis(phenylcyclopentadienyl)bis(m-trifluoromethylbenzene-sulfinato)zirconium

Tris(benzenesulfinato)cyclopentadienyltitanium

Tris(propanesulfinato)cyclopentadienylzirconium

The products of the invention are useful as catalysts for the polymerization of acetylene. Polyacetylenes, particularly those of relatively low molecular weight, are useful as components of drying-oil systems and as absorbers of ultraviolet radiation, as stated in French Patent No. 1,283,869.

In addition, as shown in the following examples, the products of the invention are useful as plant-growth regulators.

EXAMPLE A

Effect of Bis(benzenesulfinato)dicyclopentadienyltitanium on the Growth of Wheat.

Selkirk variety spring wheat was grown in controlled environment rooms in "Terralite" (washed agricultural vermiculite) under continuous 2500 fc light at 70°F and watered with nutrient solution. The "Terralite" was contained in cans; each can contained two wheat plants. Contents of each can were watered daily. In addition, the contents of each can were treated on a particular day or days with 60 ml of a water suspension of bis(benzenesulfinato)dicyclopentadienyl titanium in a concentration corresponding to an application rate of 2.5 lbs. per acre. This treatment was made 8 hours after the regular watering.

After 30 days the seed heads were just emerging; after 65 days the plants had started to senesce visibly. All plants were harvested 90 days after planting. The following table shows the number of mature seed heads and the weights of the same seed heads, expressed as percentages of values obtained in a control experiment in which no titanium compound was used. The results show that bis(benzenesulfinato)dicyclopentadienyltitanium increased both the number and the weight of mature seed heads in these wheat plants.

| Day or days treated with Ti compound* | Number of seed heads | Weight of seed heads |
|---|---|---|
| 30, 37, 44, 51, 58, 65 | 114 | 132 |
| 30 | 132 | 163 |
| 37 | 124 | 130 |
| 44 | 109 | 117 |
| 51 | 103 | 107 |
| 58 | 105 | 108 |
| 65 | 108 | 121 |

*Day of planting = 0

EXAMPLE B

Effect of Bis(Benzenesulfinato)dicyclopentadienyltitanium on the Growth of Peas.

Progress No. 9 dwarf peas were grown in controlled environment room in "Terralite" under 18 hours 2200 fc light at 72°F and 6 hours dark at 65°F per day and watered with nutrient solution. The plants were treated 13 days after planting with a water suspension of bis(benzensulfinato)dicyclopentadienyltitanium as in Example A, except at a rate corresponding to 0.5 lb per acre; treatment was at the roots. The plants were harvested 34 days later. The following were recorded, again as percentages of the corresponding values for untreated controls: height, 103; no. of mature pods, 145; no. of mature peas, 116; weight per pea, 102.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

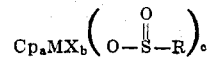

wherein:
Cp is cyclopentadienyl, optionally substituted with one or more lower alkyl or phenyl groups;
$a$ is 1 or 2;
M is Ti or Zr;
X is halogen;
$b$ is 0 or 1;
R is lower alkyl, or pehnyl, the phenyl being optionally substituted with a lower alkyl, lower alkoxy, di(lower alkyl)amino, trifluoromethyl, or halo group and containing up to a total of 12 carbons;
$c$ is 1, 2 or 3; and
$a + b + c = 4$.

2. A compound of claim 1 wherein M is Ti and R is phenyl optionally substituted with a lower alkyl.

3. The compound of claim 1 named chlorodicyclopentadienyl(ethanesulfinato)titanium.

4. The compound of claim 1 named chlorodicyclopentadienyl(methanesulfinato)titanium.

5. The compound of claim 1 named bis(benzenesulfinato)-dicyclopentadienyltitanium.

6. The process of preparing a compound of claim 1 which comprises reacting with sulfur dioxide a compound of the formula $Cp_aMX_bR_c$ wherein R, Cp, M, X, $a$, $b$ and $c$ are as defined in claim 1.

7. The process of claim 6 wherein sulfur dioxide is reacted with chloro(dicyclopentadienyl)ethyltitanium.

8. The process of claim 6 wherein sulfur dioxide is reacted with chloro(dicyclopentadienyl)methyltitanium.

9. The process of claim 6 wherein sulfur dioxide is reacted with dicyclopentadienyldiphenyltitanium.

* * * * *